Dec. 30, 1924.  1,520,810
W. E. COPITHORN
VEHICLE WHEEL
Filed May 28, 1920  2 Sheets-Sheet 1
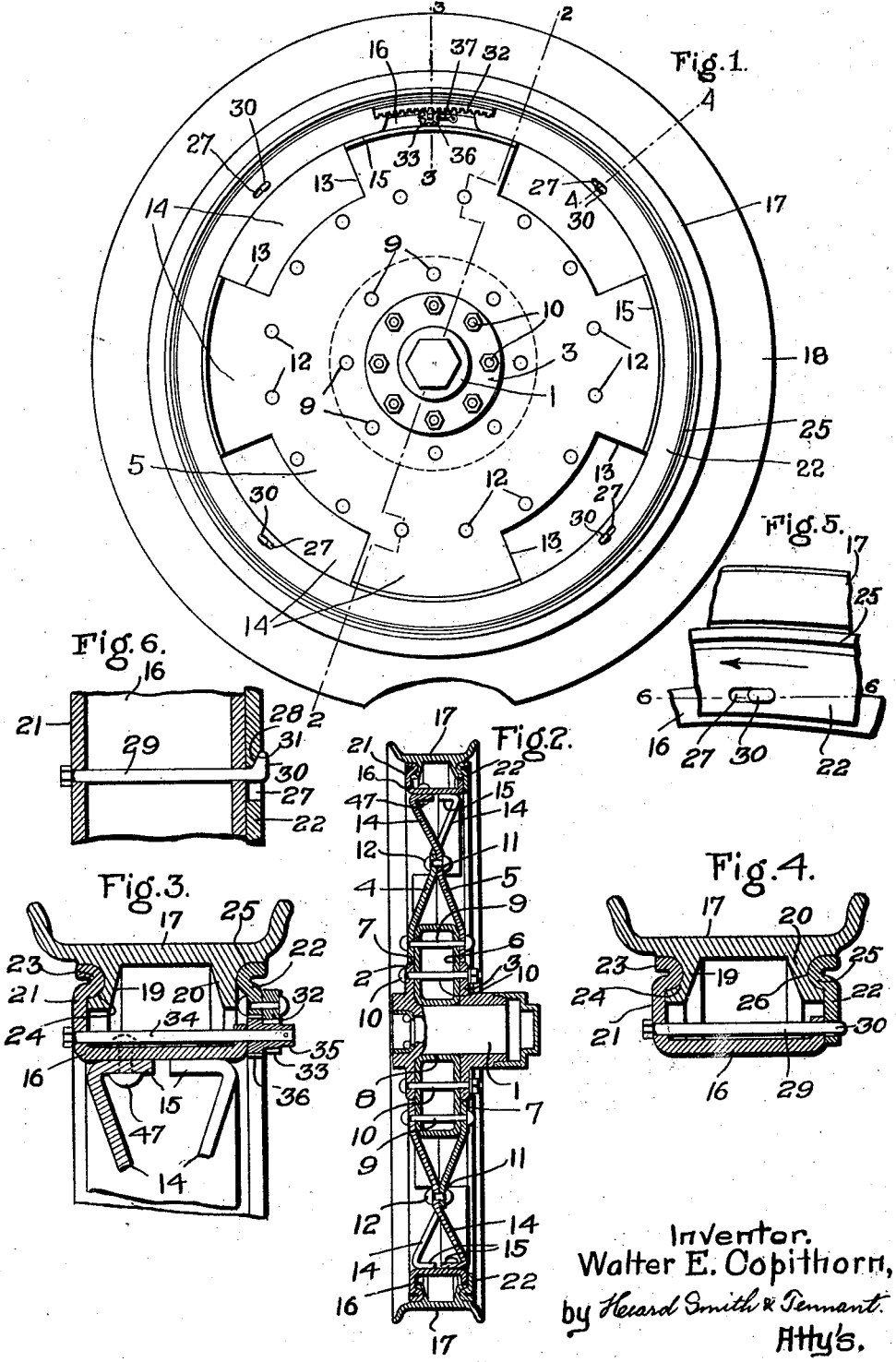
Inventor.
Walter E. Copithorn,
by Heard Smith & Tennant.
Atty's.

Dec. 30, 1924.  
W. E. COPITHORN  
VEHICLE WHEEL  
Filed May 28, 1920  
1,520,810  
2 Sheets-Sheet 2
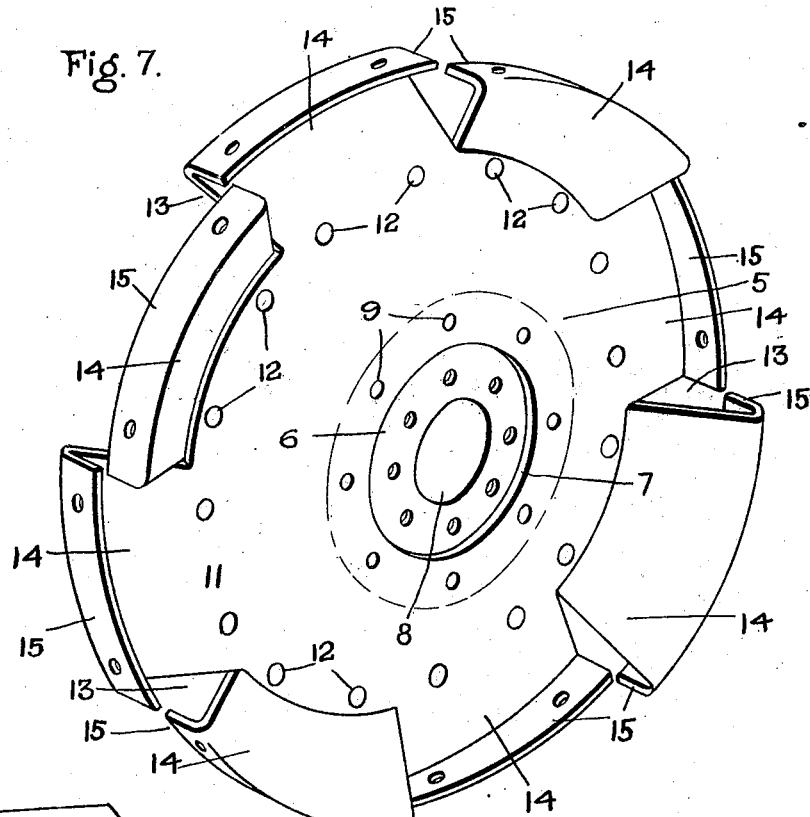
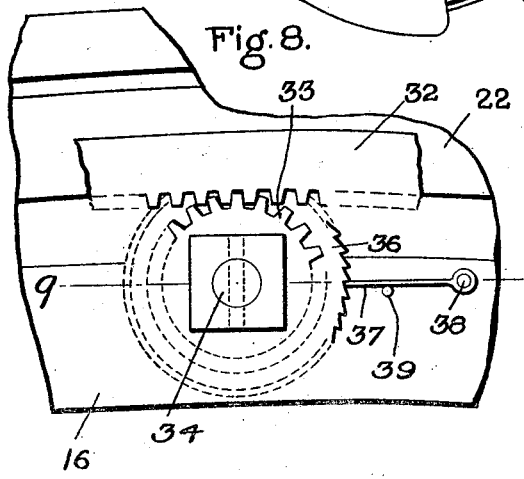
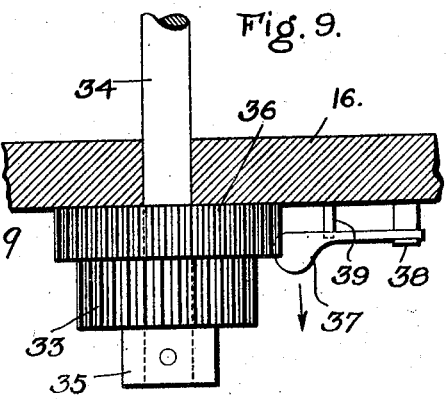
Inventor.  
Walter E. Copithorn,  
by Heard Smith & Tennant.  
Atty's.

Patented Dec. 30, 1924.

1,520,810

UNITED STATES PATENT OFFICE.

WALTER E. COPITHORN, OF NATICK, MASSACHUSETTS.

VEHICLE WHEEL.

Application filed May 28, 1920. Serial No. 385,032.

*To all whom it may concern:*

Be it known that I, WALTER E. COPITHORN, a citizen of the United States, residing at Natick, county of Essex, State of Massachusetts, have invented an Improvement in Vehicle Wheels, of which the following description, in connection with the accompanying drawing, is a specification, like characters on the drawing representing like parts.

This invention relates to vehicle wheels and particularly to wheels of the so-called "disk" type which are adapted for use with automobiles and similar vehicles. The term "disk wheel" is commonly applied to wheels in which the body portion of the the wheel is made of one or more sheet metal disks.

In my improved wheel the body portion is made of two sheet metal disks which are spaced from each other at the hub of the wheel; which have contact with each other and are rigidly secured together in a zone substantially midway of the wheel in a radial direction, and which have a crossing relation beyond said zone.

In order to give an understanding of my invention, I have illustrated in the drawings a selected embodiment thereof which will now be described, after which the novel features will be pointed out in the appended claims.

Fig. 1 is a side view of a vehicle wheel embodying my invention;

Fig. 2 is a section on the line 2—2, Fig. 1;

Fig. 3 is an enlarged transverse sectional view through the rim portion of the wheel on substantially the line 3—3, Fig. 1;

Fig. 4 is an enlarged section through the rim of the wheel on the line 4—4, Fig. 1;

Fig. 5 is a side view of Fig. 4;

Fig. 6 is a section on the line 6—6, Fig. 5;

Fig 7 is a perspective view of the body of the wheel with the rim portion detached;

Fig. 8 is an enlarged detail view showing the means for operating the locking ring for the demountable rim;

Fig. 9 is a section on the line 9—9, Fig. 8.

My wheel comprises a hub portion which may be of usual construction and which is provided with the usual hub flanges, a body portion which is detachably secured to the hub portion and is provided with two sheet metal disks of special construction, and a rim portion. The hub portion of the wheel is indicated generally at 1, and it is provided with the two hub flanges 2 and 3, as usual in automobile wheels. The hub flange 3 is usually made detachable from the hub to permit the wheel body to be placed on the hub. The hub portion may have any suitable or appropriate construction.

The two sheet metal disks comprising the body portion of the wheel are indicated at 4 and 5, respectively. These disks are spaced from each other at their central portion by means of an annular spacing member 6 which is inserted between said disks. Each disk 4 and 5 is provided with a central opening 7, and the spacing member 6 extends inwardly beyond the inner edge of the disks and projects into the opening 7. The central opening 8 in the spacing member 6 is of a size to fit over the hub portion 1, and the width of the spacing member is such as to permit it to be received between the flanges 2 and 3. This spacing member 6 may be made in any suitable way, but I will preferably make it hollow or tubular so as to reduce the weight. The disks overlie the outer portion of the spacing member and are secured thereto by means of rivets 9 so that the disks and spacing member become a rigid unitary structure. Said disks with the spacing member 6 can be placed on the hub 1 when the hub flange 3 is removed, and after said hub flange 3 has been replaced on the hub, then the hub flanges are tied together by the bolts 10 which extend through the spacing member thus rigidly securing the body to the hub.

The disks 4 and 5 incline toward each other beyond the spacing member 6 until they contact with each other at 11 in a zone which is approximately midway of the wheel body in a radial direction. The disks are rigidly secured together in the contacting zone by means of suitable rivets 12. Beyond the contacting zone 11 the disks have a crossing relation, and to provide for this, certain portions of each disk beyond the contacting zone 11 are cut away, as shown at 13, thereby leaving radially-projecting arm portions 14.

The disks are so made and assembled that the projecting arm portion 14 of each disk stands opposite an opening 13 in the other disk, and each arm portion has substantially the same dimension as the space 13 opposite it. Each arm portion 14 is bent laterally through the space 13, so that the arm portions 14 of the two disks have the crossing relation shown best in Fig. 7. The outer end of each arm portion is bent laterally to form a flange 15, and a rim member 16 encircles these flanges 15 and is rigidly secured thereto in some suitable way, as by means of rivets 47.

In order to make a symmetrical looking wheel, I will preferably so form each disk that the arm portions 14 are of the same width as the spaces between them, but this particular manner of making the disks is not essential to the invention. With this arrangement of disks the disks will not only be tied together in a median zone, but they have a crossing relation and, therefore, add great strength and stiffness to the wheel.

The rim portion 16 may have any suitable shape depending on the character of the tire which is to be used on the wheel. The drawings show a rim portion 16 constructed to receive a demountable rim 17 which in turn is constructed to receive a pneumatic tire 18 of usual type. The demountable rim 17 is formed on its interior with two annular ribs 19 and 20, and the rim portion 16 is formed at one edge with an outwardly-directed positioning flange 21 adapted to engage the rib 19, and at its other edge is provided with a removable locking ring 22 adapted to engage the rib 20. The positioning flange 21 is shown as having the curved bead 23 adapted to be received in an annular recess 24 formed in the outer face of the rib 19. The locking ring 22 is also provided with a curved bead 25 adapted to be received in a corresponding annular recess formed in the rib 20. The locking ring 22 is preferably a one-piece ring and it is provided with a plurality of openings 27, each having an inclined wall 28. The rim member 16 has retaining members 29 extending transversely therethrough, each retaining member being provided at its outer end with a head 30 having an inclined surface 31.

In placing the demountable rim 17 on the wheel, the locking ring 22 is first removed and then the demountable rim is slipped into place, after which the locking ring 22 is put in position with the heads 30 of the retaining members 29 inserted through the apertures 27. The locking ring is then moved annularly in the direction of the arrows, Figs. 5 and 6, to move the inclined surfaces 28 against the inclined surfaces 31 of the retaining members, such action operating to crowd the locking ring firmly against the demountable rim and thus securely hold the latter in place. The removing of the demountable rim involves the shifting of the locking ring in a direction opposite to the arrows in Figs. 5 and 6, thereby to disengage the heads 30 from the inclined surfaces 28, after which the locking ring can be removed laterally.

For giving this movement to the locking ring, the latter is provided with a rack 32, the teeth of which mesh with a pinion 33 that is mounted on a rotatable pin 34 carried by the rim member 16. This pinion has integral therewith a squared portion 35 to receive a wrench by which the pinion may be turned. The pinion has integral therewith a ratchet wheel 36 which is adapted to engage a locking pawl 37, the latter being pivotally mounted on a stud 38 extending from the rim portion 16. This pawl 37 normally engages a stop pin 39 also carried by the rim portion 16. To move the locking ring 22 into locking position the pinion is turned in the direction of the arrow, Fig. 8, and as this is done the teeth of the ratchet wheel 36 will click over the stop pawl 37. This stop pawl will, however, prevent any backward movement of the latch and will thus securely hold the locking ring in its locking position. When it is desired to release the locking ring the operator will move the pawl 37 in the direction of the arrow in Fig. 9 thereby to disengage it from the ratchet 36, such movement being permitted by the resiliency of the pawl. When the pawl is thus disengaged the pinion can be turned in a direction opposite to the arrow, Fig. 8, thereby shifting the locking ring into a position to permit it to be withdrawn.

One advantage of my improved wheel is that it is constructed so that it can be used with any ordinary wheel hub. My wheel can be manufactured complete except for the hub, in which case any person who wishes to convert his ordinary wooden wheel into a disk wheel can do so by removing the hub from the wooden wheel and applying my improved disk wheel body thereto.

Another advantage inherent in my invention is the increased strength and rigidity which results in making the two disks with the crossing relation beyond the median zone.

While I have illustrated a selected embodiment of my invention, I do not wish to be limited to the constructional features shown.

I claim:

1. In a wheel, the combination with a hub portion, of two sheet metal disks having their central portions spaced from each other and secured to the hub portion, said disks contacting and being rigidly secured together in a zone substantially midway of the wheel in a radial direction, portions of each disk beyond said zone being cut away thereby leaving arm portions, each arm portion of each disk being bent laterally and extending through a space between the ends of the arm portions on one disk being separated from the ends of the arm portions on the other disk substantially as much as the central portions are separated, and a rim member permanently secured to the ends of the arm portions of both disks.

2. In a wheel, the combination with a hub portion, of two sheet metal disks having their central portions spaced from each other and secured to the hub portion, said disks contacting and being rigidly secured together in a zone substantially midway of the wheel in a radial direction, portions of each disk beyond said zone being cut away thereby leaving arm portions, each arm portion of each disk being bent laterally and extending through a space between the arm portions of the other disk, a rim member permanently secured to the ends of the arm portions.

3. In a wheel, the combination with a hub portion, of two sheet metal disks having their central portions spaced from each other and secured to the hub portion, said disks inclining toward each other from the hub portion to a zone substantially midway of the wheel in a radial direction, said zone portion of each disk being radial and the radial zone portions of the two disks being parallel to and overlying each other and being firmly riveted together, portions of each disk beyond said zone being cut away thereby leaving arm portions, each arm portion of each disk being bent laterally and extending through the space between the arm portions of the other disk, and a rim member permanently secured to the ends of the arm portions.

In testimony whereof, I have signed my name to this specification.

Dr. WALTER E. COPITHORN.